United States Patent [19]

Bradham, III

[11] 4,174,734

[45] Nov. 20, 1979

[54] FLUID FLOW METERING TUBE WITH MINIMUM PRESSURE ENERGY LOSS

[75] Inventor: Allen C. Bradham, III, Milwaukee, Wis.

[73] Assignee: First Wisconsin National Bank of Wisconsin, Milwaukee, Wis.

[21] Appl. No.: 886,000

[22] Filed: Mar. 13, 1978

[51] Int. Cl.² .............................................. F16D 1/02
[52] U.S. Cl. ..................... 138/39; 73/213; 138/44
[58] Field of Search .............. 138/44, 45, 40, 39; 73/213, 205

[56] References Cited

U.S. PATENT DOCUMENTS

| | | | |
|---|---|---|---|
| 3,167,333 | 1/1965 | Hall et al. | 138/44 |
| 3,273,390 | 9/1966 | Brown | 73/213 |
| 3,774,645 | 11/1973 | Pompa | 73/213 |

*Primary Examiner*—Lenard A. Footland
*Attorney, Agent, or Firm*—Darbo & Vandenburgh

[57] ABSTRACT

To minimize loss of pressure energy in metering fluid flow by means of primary flow tube elements, the contour of the throat inlet section of the flow tube is that which produces a constant rate of acceleration of flow through the inlet to the throat section. The contour equation is given. At least in larger sizes of flow tubes, the inlet section is formed of thin metal such as stainless steel and arranged in such a way that it is not subject to mechanical stress in the installed assembly.

3 Claims, 5 Drawing Figures

FLUID FLOW METERING TUBE WITH MINIMUM PRESSURE ENERGY LOSS

BACKGROUND AND SUMMARY OF THE INVENTION

A variety of metering devices are used to measure the flow of streams of fluid, liquid and gas. Any such metering device necessarily impedes the flow to some extent. Such interference, at least in forced flow through pipes, is invariably undesirable. Since the transmission of fluid through pipes requires energy input by pumps, compressors or the like, the loss of pressure resulting from the flow of a stream of fluid through a metering device is costly and therefore desirably minimized.

The invention herein described relates to the type of flow meter which employs a primary flow element that creates a fluid pressure differential that is proportional to the rate of flow of the fluid so that measurement of the pressure differential indicates the rate of flow. Since the invention is primarily concerned with the pressure loss problem, it contemplates primary flow elements of the flow tube type rather than orifice plates and nozzles which are characterized by relatively great pressure losses.

A typical flow or Venturi tube comprises an inlet section which reduces the cross-sectional area of the flowing stream from that of the upstream pipe to that of the throat section, at which the flow area is the smallest, and a generally conical pressure recovery or diffuser section which leads back toward or to the full area of the downstream pipe.

A considerable amount of work has been done in efforts to reduce pressure losses which are concomitant with the flow of fluid streams through metering flow tubes. Almost invariably the approach to this problem has been directed to the pressure recovery section of the device downstream from the throat. The concensus of scientific thinking appears to have been that energy losses were related to stream/wall interface phenomena as the cross-sectional area of the flowing stream was returned to that of the transmission pipe. A typical statement is that of Prof. Leslie J. Hooper in his excellent discussion entitled, Design and Calibration of the Low-Loss Tube, ASME Paper No. 61-WA-80, presented Nov. 26, 1961: "It is well known that the losses due to contraction of sections are almost negligible while the losses in expanding sections are far greater. For this reason the analysis of the diffuser was undertaken in order to secure a low loss in this tube design."

Functional design features of the flow tubes herein described conform, generally, to the guidelines of Prof. Hooper's paper. However, major improvement with respect to pressure loss characterizes the tubes of the instant invention by reason of a novel approach to the problem involving the design of the throat inlet section. The contour of this section in the improved flow tube is such that the acceleration of flow of the fluid throughout the length of the inlet section is constant. It has been found that the transition in flow velocity from that in the pipe to the maximum at the throat of the tube, effected at a constant rate of acceleration, is of such a fully controlled nature that losses are of a very much lower order of magnitude than are the losses experienced with flow tubes having inlet section contours generally in use; e.g., those which are circular in profile.

It is, accordingly, an object of this invention to provide fluid flow metering tubes which impose only very low pressure losses on flow through the meter; more specifically, the invention is directed to the provision of a novel throat inlet section for use in primary flow tube elements to minimize pressure loss, the inlet section having a flow controlling contour which results in acceleration of flow at a constant rate.

A further object is to provide a flow tube throat inlet section structure which can be fabricated with faithful adherence to contour design specification and which, also, is not subjected to mechanical stress in the installed assembly so that calibration is maintained through a long period of use.

More specifically, the throat inlet section may be formed of thin metal which is attached to and supported by only the tube throat section structure without engagement with the stress bearing structure of the meter.

BRIEF DESCRIPTION OF THE DRAWINGS

In the accompanying drawings.

DESCRIPTION OF EXAMPLES EMBODYING BEST MODE OF THE INVENTION

Although the improved throat inlet section of the invention is useful in the various throated primary elements including, for example, Venturi tubes, nozzles and even flumes, the invention is described herein as employed in typical flow tubes as these metering units would be installed in pipelines.

Figure 1:
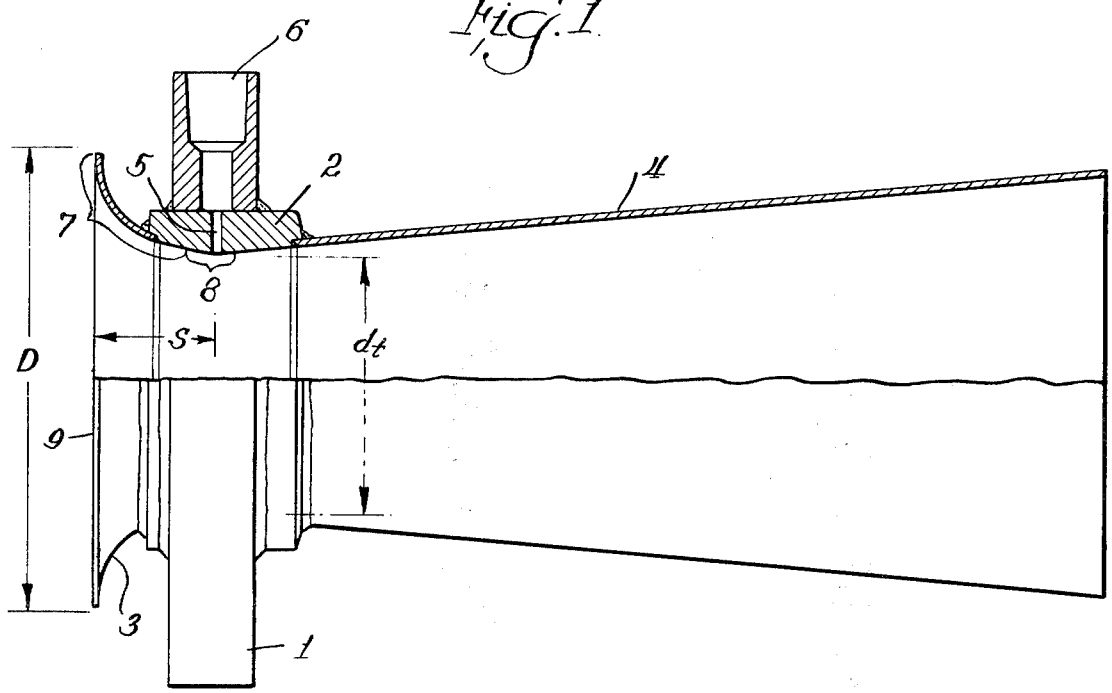
FIG. 1 shows a flow tube of the insert type in longitudinal quarter section showing the throat inlet section of the invention.

The flow tube illustrated in FIG. 1 is designed to be inserted in a pipeline and mounted in position by the adjoining pipeline end flanges, not shown, by clamping flange 1 between them by means of bolts. The annular throat section 2 is welded to the inside periphery of the circular flange 1, as indicated, portion 3 of the throat inlet section is welded to the upstream side of throat section 2 and recovery cone 4 is welded to the downstream side of the throat section. A throat pressure measuring access hole 5 extends radially through the throat section 2 and connects with a radial bore 6 for connection of a pressure measuring instrument.

The flow tube thus described in general terms is well known. The invention resides in the contour of the inside of the throat inlet section; that is, the flow stream defining surface 7. As will be seen as the detailed description proceeds, the portion 8 of the throat section, being the zone of greatest constriction and which connects the inlet section with the recovery cone, is conventionally circular in profile and the surface of the throat downstream therefrom may be an extension of the conical surface of recovery cone 4.

Figure 2:
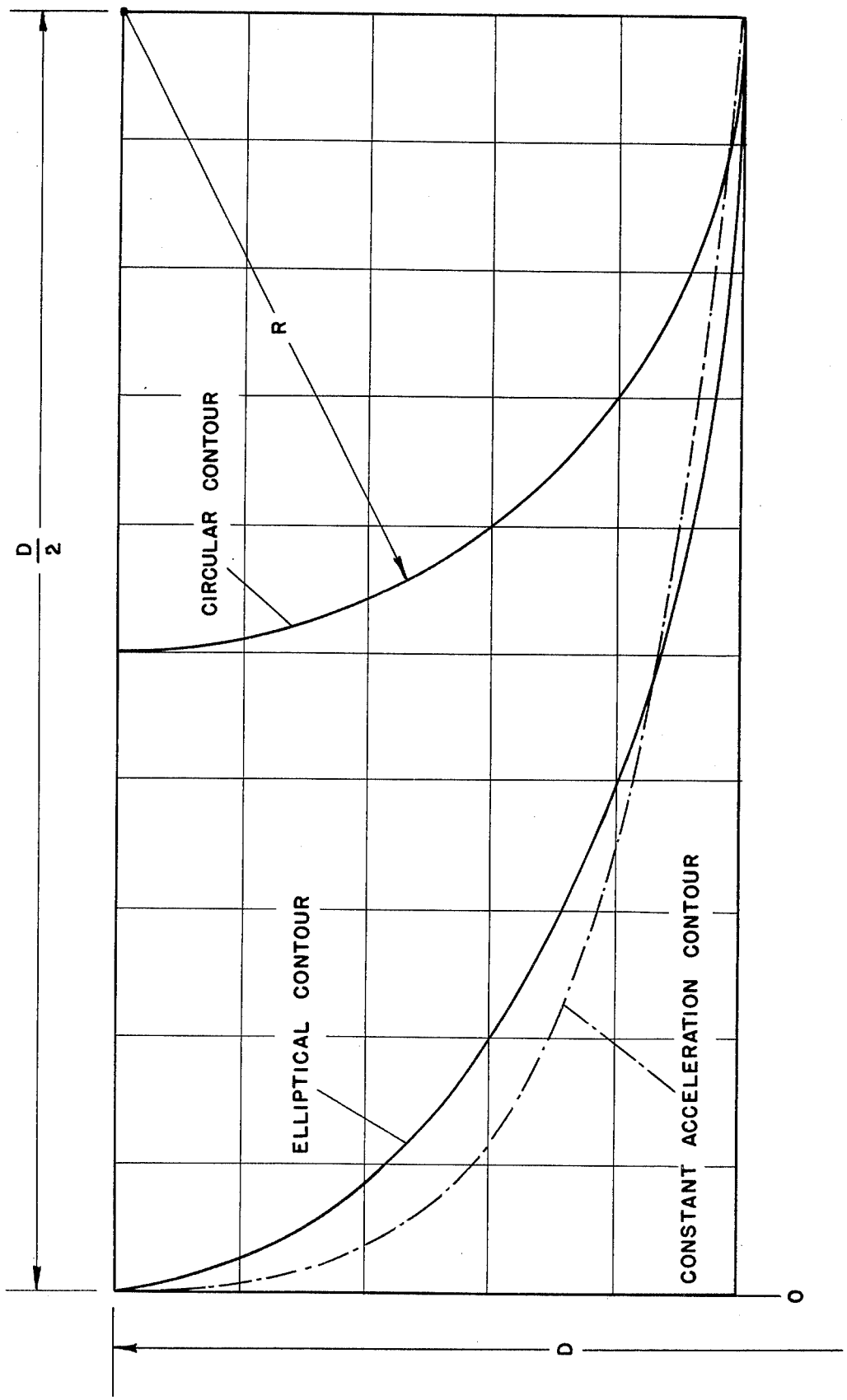
FIG. 2 is a diagram showing the profile of the throat inlet section of the invention in comparison with the profiles of known inlet sections.

To achieve constant acceleration of flow of the stream, i.e., acceleration at the same rate, as the length of the throat inlet section is traversed from the inlet end to the throat of the flow tube as required to achieve the low loss operating feature of the flow tube of the invention, the inside surface 7 the throat inlet section, must present a contour which, with practical fabrication tolerances, is critical. The profile of this contour is defined by an equation given below and is shown in the dot-dash line denominated "constant acceleration contour" in FIG. 2. Comparable circular and elliptical profiles, both of which have been used in flow tube throat inlets, are also shown in FIG. 2 in solid lines.

The profile of the constant acceleration contour of the throat inlet section of the invention is defined by the following equation:

$$d_i = \sqrt{\cfrac{1}{\cfrac{1}{D^2} + \left[\cfrac{1}{d_t^2} - \cfrac{1}{D^2}\right]\sqrt{\cfrac{S_i}{S}}}}$$

wherein
  D = section contour inlet diameter (essentially pipe diameter)
  $d_t$ = section contour outlet diameter (essentially throat diameter)
  S = section contour length
  $S_i$ = increment of contour length (distance from inlet of section contour)
  $d_i$ = diameter of contour at increment $S_i$ The diameter D of the inlet end of the throat inlet section is the inside diameter of the pipe, with clearance, into which the tube is inserted. The length of the inlet section S, determined by judgmental choice, is more or less conventionally taken as one-quarter to one-half of the diameter of the pipe with which the flow tube is used. The throat diameter $d_t$, essentially the diameter of the inlet section at the throat end, is also arbitrarily assigned on the basis of established practice to provide the necessary differential pressure. The profile of the throat inlet section can be plotted from this equation, the value of $d_i$ being determinable for each increment of distance from the inlet 9, in any number of steps, to, finally, the throat zone 8. It is this profile that is shown as the constant acceleration contour in FIG. 2.

Figure 4:
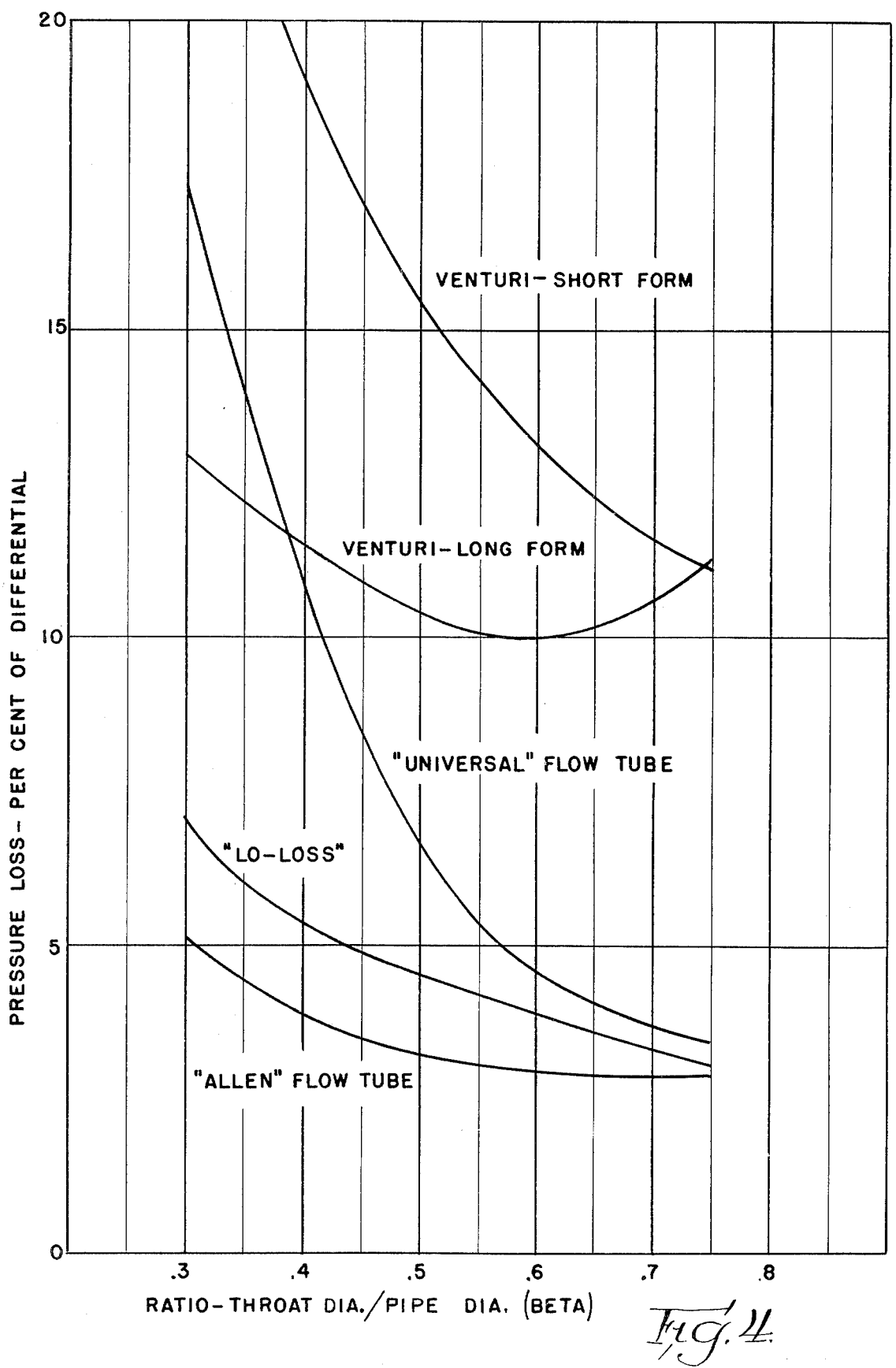
FIG. 4 is a graph which shows the published comparative pressure losses experienced in the use of different types of primary elements including the flow tube of the invention.

The pressure loss characteristics of flow meter primary elements are conventionally given in terms of percent of differential pressure for different "BETA" ratios (ratio of throat diameter of the element to the diameter of the pipe in which the meter is installed). A graph showing these characteristics for several typical primary elements is shown in FIG. 4. The comparable curve of an "Allen" flow tube, having the throat inlet section of the invention, is also shown. No full pipe primary element having a smaller pressure loss characteristic than that depicted for the flow tube of the invention is known.

Figure 3:
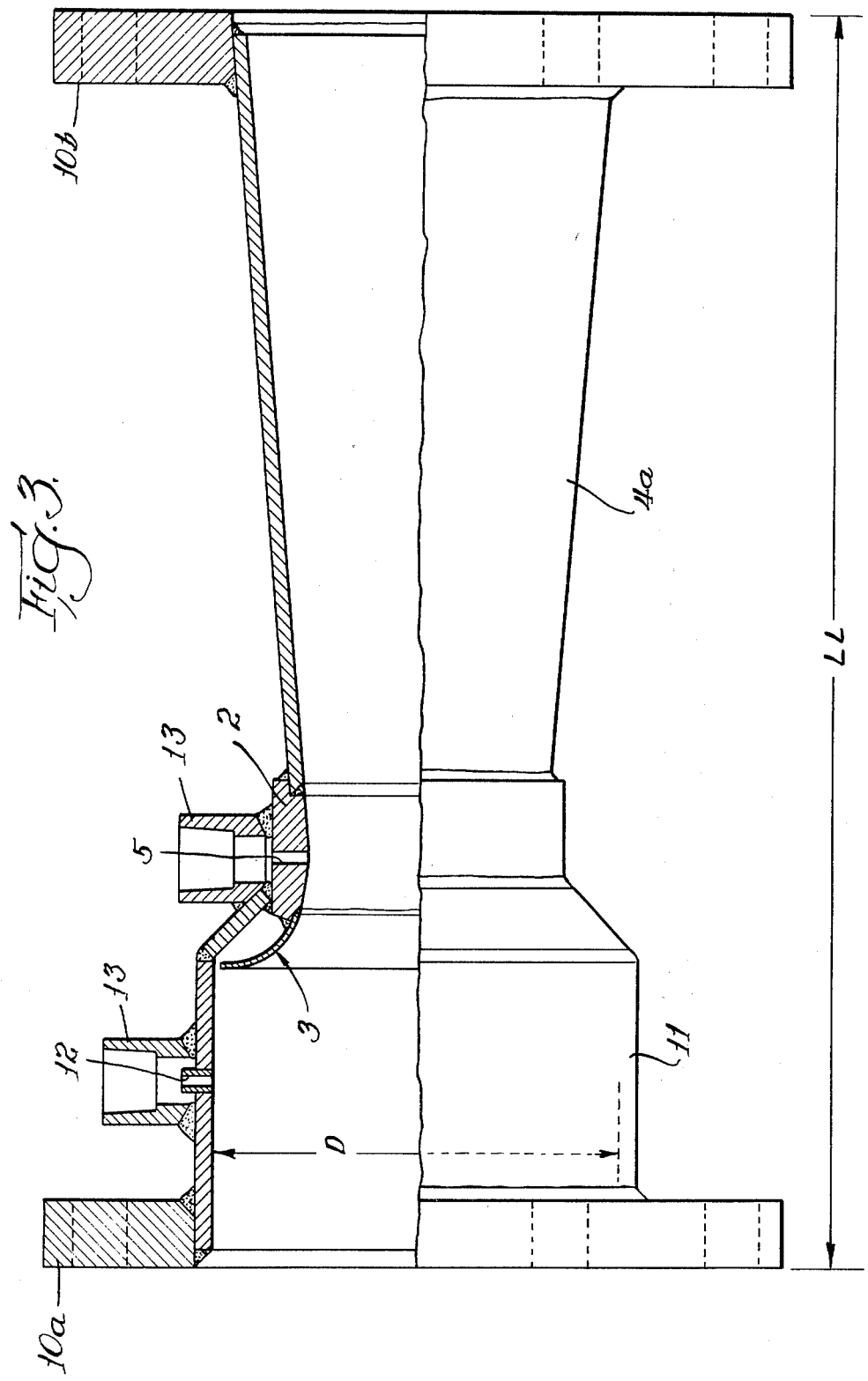
FIG. 3 is a longitudinal, quarter-sectional view of a flow tube as a unit complete with pipe line mounting flanges and embodying the throat inlet section of the invention.

The flow tube shown in FIG. 3 is similar to that of FIG. 1 in its essential functional parts, including essentially the throat inlet section 3. The metering unit is provided with end flanges 10a and 10b by which the unit is mounted in line in a pipeline by bolting to the pipe end flanges. Recovery cone 4a extends from the outlet end flange 10b upstream to throat section 2, being welded to these parts and being heavy enough to provide the strength needed for a structural part in the pipeline. An inlet tube 11 extends between and is welded to inlet end flange 10a and throat section 2, pressure measuring access holes 12 and 5 being provided to measure upstream and throat pressures, respectively. Couplings 13 are provided for connection of suitable instruments to measure pressure.

The inner surface contour of throat inlet section 3 is that which provides the desired constant acceleration of flow to the throat as described with reference to the tube of FIG. 1. As can be seen in FIG. 3, inlet section 3, the contour of which is relatively critical, is welded to the throat structure and is otherwise unattached to the support structure of the meter. Thus, it is not subjected to pipeline stress and therefore not subject to physical deformation which would render it inaccurate as a vital part of the meter. Since it supports only itself, it may be fabricated from thin metal, substantially thinner than the thickness of the pipeline in which the flow tube is installed e.g., one-eighth inch thick stainless steel in a large size tube, say sixteen inch. Smaller tubes, in which the hydraulic pressures exerted on the inlet section are smaller, may employ thinner metal.

Figure 5:
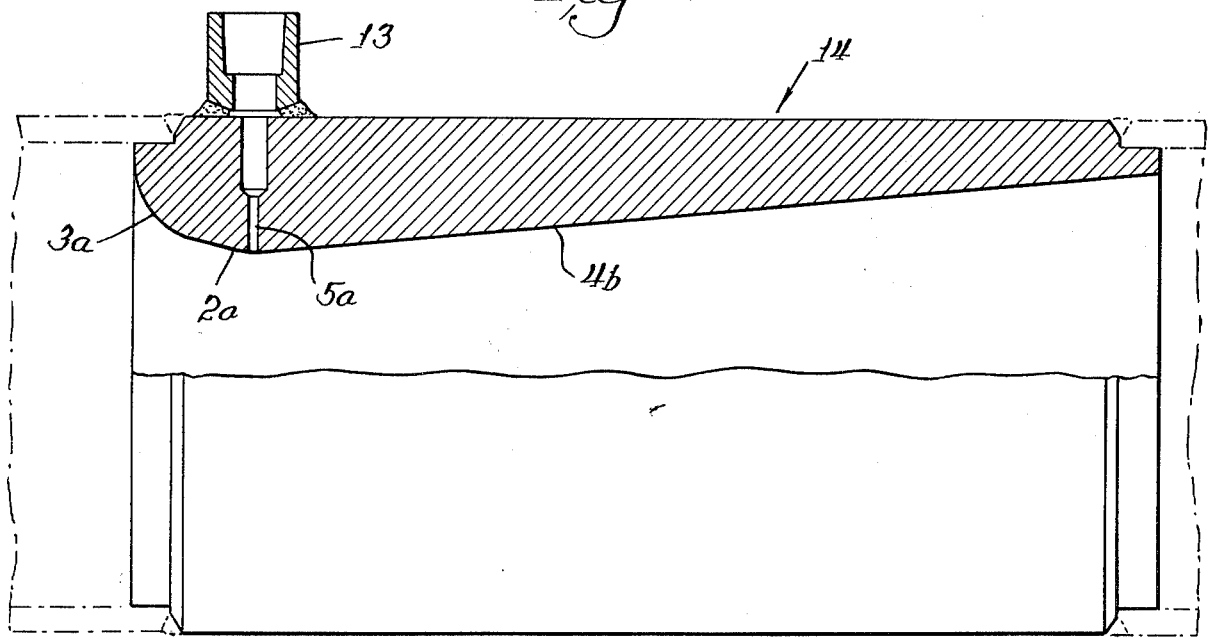
FIG. 5 is a longitudinal quarter-sectional view of a flow tube of the invention in which all of the elements of the tube, including the throat inlet section, form the unitary body of the meter.

Another example of a primary flow element employing the throat inlet section of the invention is illustrated in FIG. 5. In the flow tube or nozzle of FIG. 5, the throat inlet section 3a, throat section 2a and recovery cone 4b are part of a single body 14 which is adapted to be inserted in a gap provided in a relatively small diameter pipeline. Coupling 13 provides for connection of a pressure measuring instrument which has access to the throat of the unit through a hole 5a in body 14. The surface of throat inlet section 3a is machined to provide the contour necessary for constant acceleration flow to the throat section as above described.

I claim:

1. In a full pipe primary element flow tube comprising an inlet section, a throat section and a recovery section, the improvement wherein the stream-defining internal contour of said inlet section is that which produces a constant rate of acceleration of flow of the fluid in flowing through said inlet section, the profile of said inlet section being defined by the following equation:

$$d_i = \sqrt{\cfrac{1}{\cfrac{1}{D^2} + \left[\cfrac{1}{d_t^2} - \cfrac{1}{D^2}\right]\sqrt{\cfrac{S_i}{S}}}}$$

wherein
  D = section contour inlet diameter (essentially pipe diameter)
  $d_t$ = section contour outlet diameter (essentially throat diameter)
  S = section contour length
  $S_i$ = increment of contour length (distance from inlet of section contour)
  $d_i$ = diameter of contour at increment $S_i$.

2. Structure in accordance with claim 1 wherein at least the major, upstream portion of said inlet section is composed of thin metal and is supported only at the downstream end thereof whereby the same is not subjected to pipeline structural stress, said thin metal being substantially thinner than the thickness of the pipeline in which said flow tube is adapted to be installed.

3. Structure in accordance with claim 2 wherein said inlet, throat and recovery sections comprise a unitary body.

* * * * *

UNITED STATES PATENT AND TRADEMARK OFFICE
CERTIFICATE OF CORRECTION

PATENT NO. : 4,174,734
DATED : November 20, 1979
INVENTOR(S) : Allen C. Bradham, III It is certified that error appears in the above-identified patent and that said Letters Patent are hereby corrected as shown below:

Col. 1 [73] Assignee: "First Wisconsin National Bank of Wisconsin" should read --First Wisconsin National Bank of Milwaukee--

Signed and Sealed this

First Day of April 1980

[SEAL]

Attest:

SIDNEY A. DIAMOND

Attesting Officer

Commissioner of Patents and Trademarks